US005379518A

United States Patent [19]

Hopper

[11] Patent Number: 5,379,518

[45] Date of Patent: Jan. 10, 1995

[54] METHOD OF PRODUCING A WINDOW SASH

[75] Inventor: James P. Hopper, Delmont, Pa.

[73] Assignee: Caradon America Inc., Norcross, Ga.

[21] Appl. No.: 13,765

[22] Filed: Feb. 4, 1993

[51] Int. Cl.[6] .......................... B23P 19/04; E06B 1/32

[52] U.S. Cl. .................................. 29/897.312; 29/415; 29/462; 29/897.3; 49/DIG. 1; 52/204.54

[58] Field of Search ........... 29/897.3, 897.31, 897.312, 29/897.32, 415, 416, 462, 463; 52/309.14, 741.1, 204.54, 212, 400, 476, 775, 824; 49/DIG. 1, 506

[56] References Cited

U.S. PATENT DOCUMENTS

| | | | |
|---|---|---|---|
| 2,860,744 | 11/1958 | Mascari | 52/212 |
| 3,140,763 | 7/1964 | Edelstein | 52/775 |
| 3,201,831 | 8/1965 | Cudini | 52/204.54 |
| 3,455,080 | 7/1969 | Meadows | 52/775 X |
| 3,527,011 | 9/1970 | Bloom et al. | 49/DIG. 1 X |
| 3,823,524 | 7/1974 | Weinstein | 29/897.312 X |
| 3,918,231 | 11/1975 | Kessler | 52/476 X |
| 4,342,144 | 8/1982 | Doguchi | 29/897.312 |
| 4,407,100 | 10/1983 | Huelsekopf | 52/400 X |
| 4,539,243 | 9/1985 | Miller | 52/824 X |
| 5,005,333 | 4/1991 | Ott | 52/775 X |
| 5,216,810 | 6/1993 | Kendall | 52/309.14 X |

*Primary Examiner*—Peter Dungba Vo

*Attorney, Agent, or Firm*—Arnold B. Silverman; David V. Radack

[57] ABSTRACT

A method of producing a window sash by first providing a window sash frame and then cutting the window sash frame longitudinally to create a first frame portion and a second frame portion. A connection member is secured to the first frame portion and a glazing member is placed into one of the frame portions. After this, the second frame portion is secured to the first frame portion by virtue of the connection member to form the window sash.

11 Claims, 5 Drawing Sheets

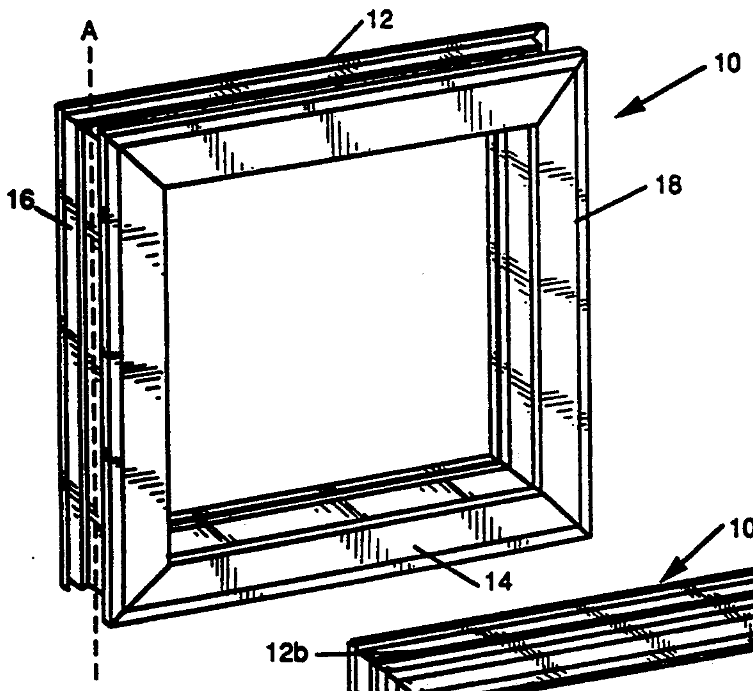
FIG..3
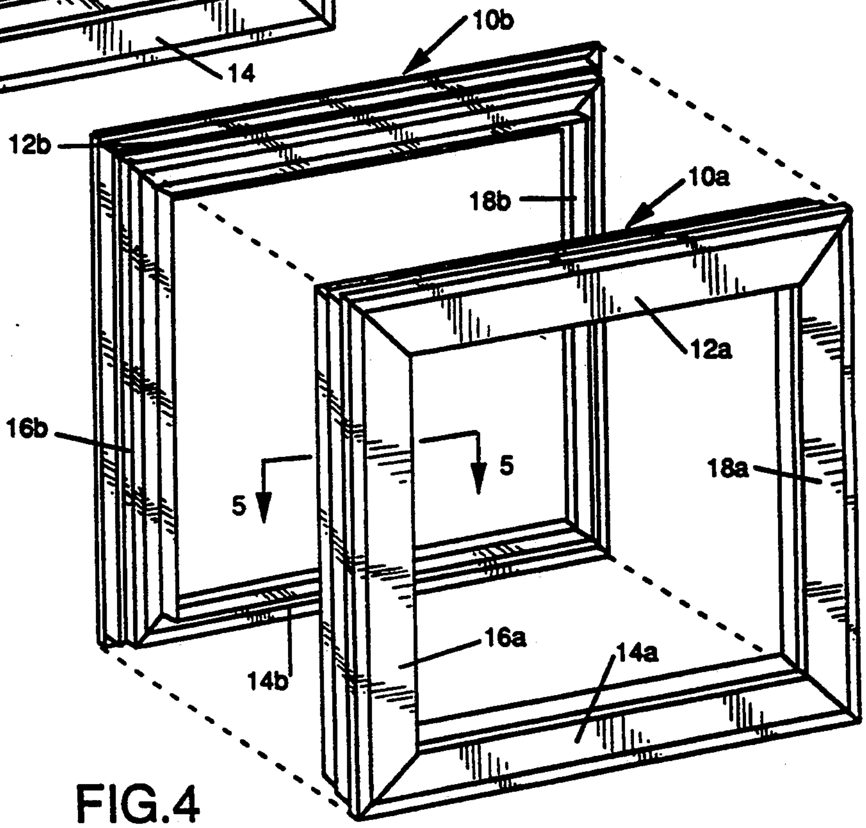
FIG.4
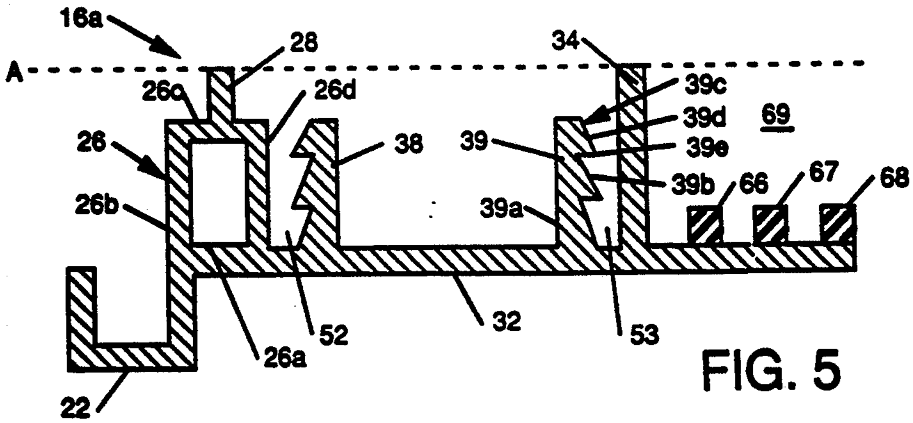
FIG. 5

METHOD OF PRODUCING A WINDOW SASH

BACKGROUND OF THE INVENTION

This invention relates to a method of producing a window sash and an associated product and more particularly to a window sash that eliminates the need to provide a parting bead.

Conventional window sashes are made by a process which involves several interrelated steps. The first step is to produce framing members that will be used to form the window sash frame. These framing members can be made of aluminum, vinyl or other material. For example, four vinyl extrusions can be used to form a rectangular window sash frame. The four vinyl extrusions typically have mitred corners and are joined by corner keys, welding or other joining methods.

After the window sash frame is formed, the glazing panel (usually a pane of glass) is dropped into the space formed by the four framing members. The glazing is supported by elongated flanges on the inside of each of the framing members. In order to secure the glazing panel in the window sash frame, four separate elongated parting beads are placed on top of the glass panel, on the opposite side of each of the elongated flanges. The parting bead is secured to the glazing panel by adhesive glazing tape or a rigid polyvinyl chloride ("PVC") employing soft vinyl fingers known to those skilled in the art as dual durometer.

There are several disadvantages associated with the parting bead. If the window sash is installed in a building opening with the parting bead facing the outside, it is easy for a thief or other intruder to forcibly separate the parting beads from the window sash and remove the glazing so as to create access into the building in which the window sash is mounted. If the parting bead faces the inside of the building, the aesthetics of the window are affected by the presence of a line in the window sash frame Furthermore, with the parting bead on the inside there is an increase of water and air filtration into the home. When a parting bead is secured by using a glazing tape, it is very costly to reglaze the window sash and in addition the glazing can shift in the sash which can cause stress breakage in the glazing. Finally, there is a vinyl window industry test, known to those skilled in the art as Test No. D-4099 for de-glazing. Most glazings secured by a parting bead with a dual durometer will fail this test.

There have been some suggestions in the prior art as to the formation of window sash frames without parting beads. U.S. Pat. No. 3,455,080 discloses plastic extrusions used for window frames. The extrusion is made having a channel with flexible ribs and portions having respective teeth-like projections. The portions are joined by a frangible connecting web. The window sash formed with the extrusions is assembled as shown in FIG. 4. Three mitred extrusions are placed in a U-shaped configuration and a pane of glass is inserted into the channel portions thereof. After this, pressure is exerted on wall portion to break the web and thus cause the base portions to engage each other by means of the teeth thereon. This also causes deformation of ribs. The corners of the frame are heat sealed or connected with adhesives. The top extrusion is connected to the rest of the extrusions by means of corner keys. See also U.S. Pat. Nos. 3,918,231 and 4,539,243.

Despite the prior art methods and products, there remains a need for an improved method of making a window sash and an improved window sash.

SUMMARY OF THE INVENTION

The present invention has met the hereinbefore mentioned needs. The method comprises providing a window sash frame and cutting the window sash frame longitudinally to create a first frame portion and a second frame portion. The method further comprises securing connection means in the first frame portion and placing a glazing member into one of the frame portions. The method then comprises securing the second frame portion to the first frame portion by means of the connection means to form the window sash. An associated product is also disclosed and claimed.

It is an object of the invention to provide an effective and efficient method to produce a window sash without the use of a parting bead.

It is a further object of the invention to provide a vinyl window sash frame which not only is connected by a connection means, but which is also reinforced by the connection means.

It is a further object of the invention to provide recesses in the framing members which receive portions of the connection means.

It is still a further object of the invention to provide complementary barbs in the recesses which engage teeth in the connection means.

It is a further object of the invention to provide a window sash which is more intruder resistant than prior art window sashes.

It is still a further object of the invention to provide a window sash which is more weather resistant and easier to reglaze than prior art window sashes.

These and other objects of the invention will be more fully understood from the following description of the invention with reference to the drawings appended to this application.

BRIEF DESCRIPTION OF THE DRAWINGS

FIG. 3 is a perspective view of the window sash frame of FIG. 1 showing where the window frame is cut in accordance with the method of the invention.

FIG. 4 is a perspective view of the window sash frame after it is cut into two framing portions.

FIG. 5 is a cross-sectional view taken along line 5—5 of FIG. 4.

DESCRIPTION OF THE PREFERRED EMBODIMENT

Figure 1:
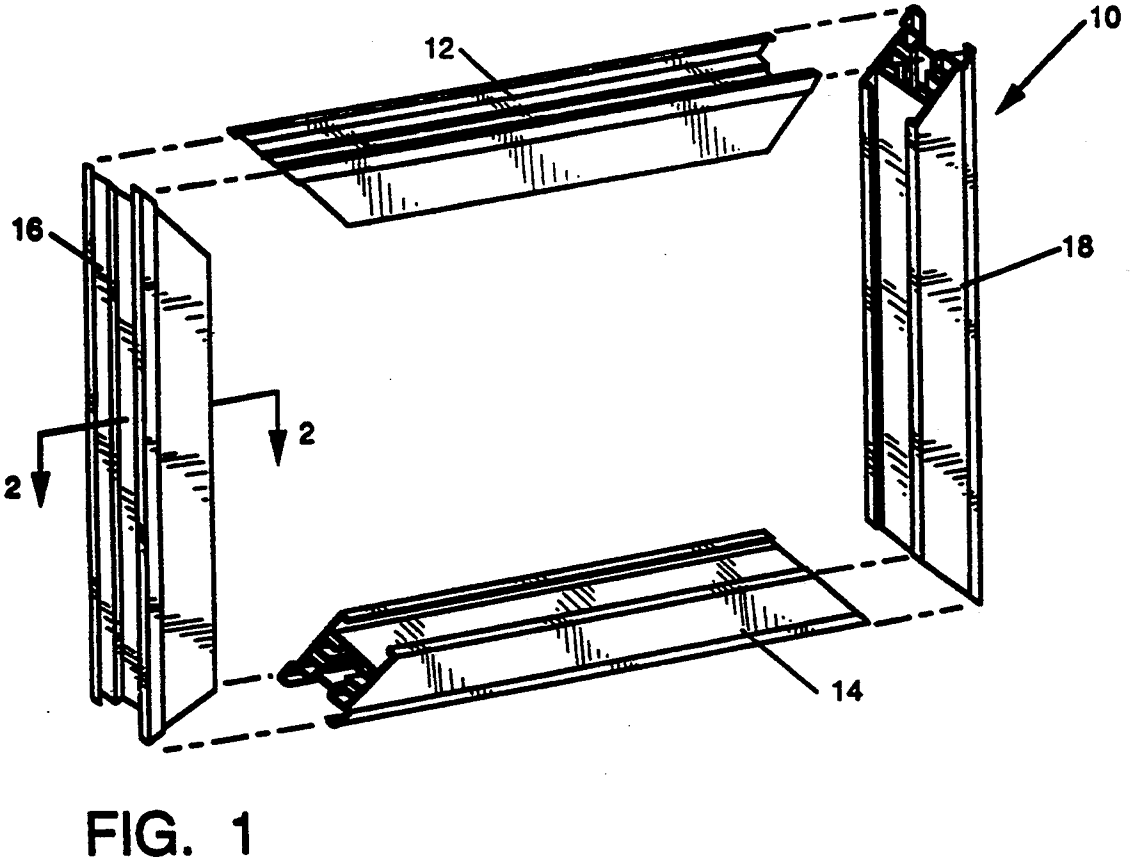
FIG. 1 is an exploded perspective view of a vinyl window sash frame.

Referring to FIG. 1, an exploded perspective view of a window sash frame 10 is shown. The window sash frame 10 consists of an upper extrusion 12, lower extrusion 14, left side extrusion 16 and right side extrusion 18. The extrusions are all made from vinyl by a process well known to those skilled in the art.

Figure 2:
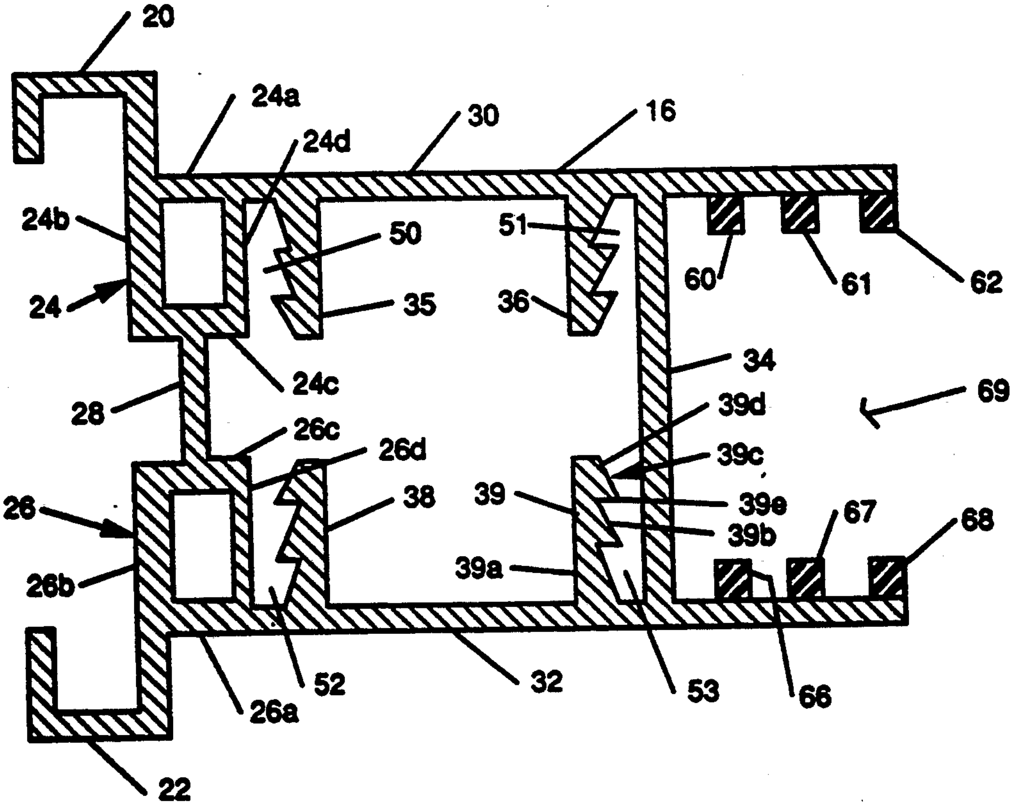
FIG. 2 is a cross-sectional view taken along line 2—2 of FIG. 1.

FIG. 2 shows a cross-sectional view of left side extrusion 16. The left side extrusion 16 consists of a pair of elongated opposed inturned U-shaped flanges 20 and 22 which are connected to elongated rectangular flanges 24 and 26. Flanges 24 and 26 strengthen the window sash frame and also provide a structure for mounting certain types of window hardware (handles, locks etc.). The rectangular flanges 24 and 26 have sides **24*a*, 24*b*, 24*c*, and 24*d* and sides 26*a*, 26*b*, 26*c* and 26*d*. Sides 24*c* and 26*c* are joined by bridging flange 28**.

Sides **24*a* and 26*a* form part of elongated longitudinal flanges 30 and 32. A second bridging flange 34 joins longitudinal flanges 30 and 32. Extending generally perpendicularly from longitudinal flange 30 and generally towards longitudinal flange 32 are elongated barb flanges 35 and 36. Extending generally perpendicularly from longitudinal flange 32 and generally towards longitudinal flange 30 are elongated barb flanges 38 and 39. Each barb flange 35, 36, 38 and 39 has a straight edge, such as straight edge 39*a* of barb flange 39 and toothed edge, such as toothed edge 39*b* of barb flange 39. Toothed edge 39*b* defines teeth, such as tooth 39*c* on flange 39. Tooth 39*c* consists of a bevelled leading edge 39*d* and a horizontal straight edge 39*e***.

It will be appreciated that four locking recesses 50, 51, 52 and 53 are formed by (i) the toothed edge of barb flanges 35, 36, 38 and 39; (ii) flanges **24*d*, 26*d*, the upper portion of flange 34 and the lower portion of flange 34; and (iii) longitudinal flanges 30 and 32, respectively. These locking recesses 50–53 will be described further hereinbelow with respect to FIGS. 7 and 9. Finally, three elongated weatherstripping strips 60, 61 and 62 are extruded to longitudinal flange 30 and three elongated weatherstripping strips 66, 67, 68 are extruded to longitudinal flange 32. These weatherstripping strips are preferably made of rigid PVC. Weatherstripping strips 60, 61, 62, 66, 67 and 68 are known in the industry as soft vinyl fingers, also known as dual durometer. As is known, the soft PVC flows into slots (not shown) formed in the longitudinal flanges 30 and 32. Once the PVC hardens, the strips 60–62 and 66–68 are formed. The end portions of longitudinal flanges 30 and 32 containing the weatherstripping strips 60–62 and 66–68, respectively, form a recess 69 in which is disposed a glazing panel as will be described hereinafter with respect to FIG. 7**.

FIG. 3 shows the window sash frame 10 in its joined configuration. As was explained hereinbefore, the mitred corners of the window sash frame members 12, 14, 16 and 18 can be joined by welding. The welding can be accomplished by a welding machine such as a welding machine sold by Urban or Wegoma. The welding machine heats the mitred corners of the window sash frames to bond the corners together. The welds on the joined window sash frame 10 then can be cleaned by using a cleaning machine such as a cleaning machine which is sold by Wegoma or Urban.

In accordance with the invention, the joined window sash frame 10 is then cut longitudinally along line A of FIG. 3. As used herein, the term "longitudinally" means passing through a plane which is generally parallel to the glazing panel (FIGS. 7 and 8) even though the glazing panel is not present in the window sash frame. The cutting of the window sash from is accomplished using a circular saw equipped with fixtures and power rollers to pull the window sash towards the saw to produce an even and clean cut. After cutting, two generally symmetrical and mirror image halves **10*a* and 10*b* of the window sash frame 10 are created as is shown in FIG. 4. Half frame 10*a* consists of half frame members 12*a*, 14*a*, 16*a* and 18*a* and half frame 10*b* consists of half frame members 12*b*, 14*b*, 16*b* and 18*b*. As can be seen in FIG. 5, the longitudinal cut-line A through half frame member 16*b* severs bridging flanges 28 and 34. As can further be seen in FIG. 5, half frame 10*a* and half frame 10*b* are completely severed from each other so that no section of half frame 10*d* contacts any section of half frame 10*b***.

Figure 6:
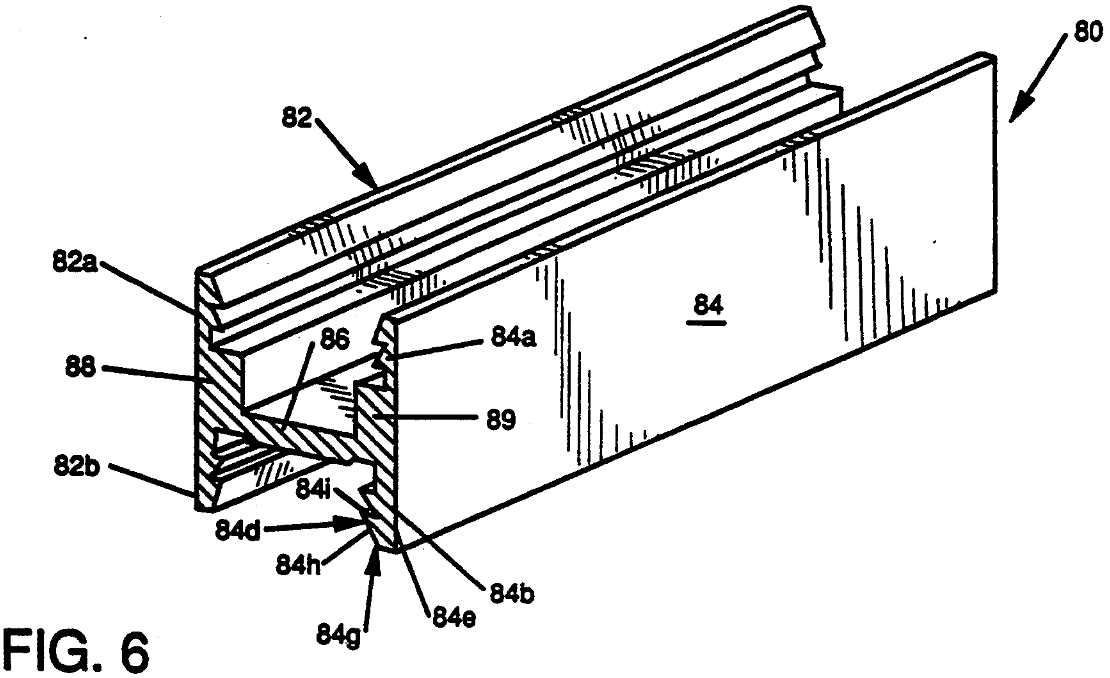
FIG. 6 is a perspective view of an embodiment of the connection means of the invention.

Once the window sash frame 10 is cut, connection means are then secured into one of the half members **10*a*, 10*b* of window sash frame 10. A connection means 80 in accordance with the invention is shown in FIG. 6. The connection means 80 is preferably made of extruded aluminum and has a generally H-shape and is preferably an integral extrusion. The connection means 80 can be made of other rigid materials and can be formed of separate pieces that are secured together. The connection means 80 also serves to reinforce and rigidize the window sash frame 10**.

The connection means 80 shown in FIG. 6 has two generally parallel opposing vertical flanges 82, 84 joined by a generally horizontal flange 86. The vertical flanges 82 and 84 each have an upper portion **82*a*, 84*a* and a lower portion 82*b*, 84*b*. Disposed between upper portions 82*a*, 84*a* and horizontal flange 86 is an extension portion 88, 89, respectively. Each upper and lower portion 82*a*, 84*a*, 82*b*, 84*b*, such as lower portion 84*b* has a toothed portion 84*d* and a straight edge 84*e*. The toothed portion 84*d* contains two teeth, such as 84*g*, which has a bevelled leading edge 84*h* and a horizontal trailing edge 84*i***.

Figure 7:
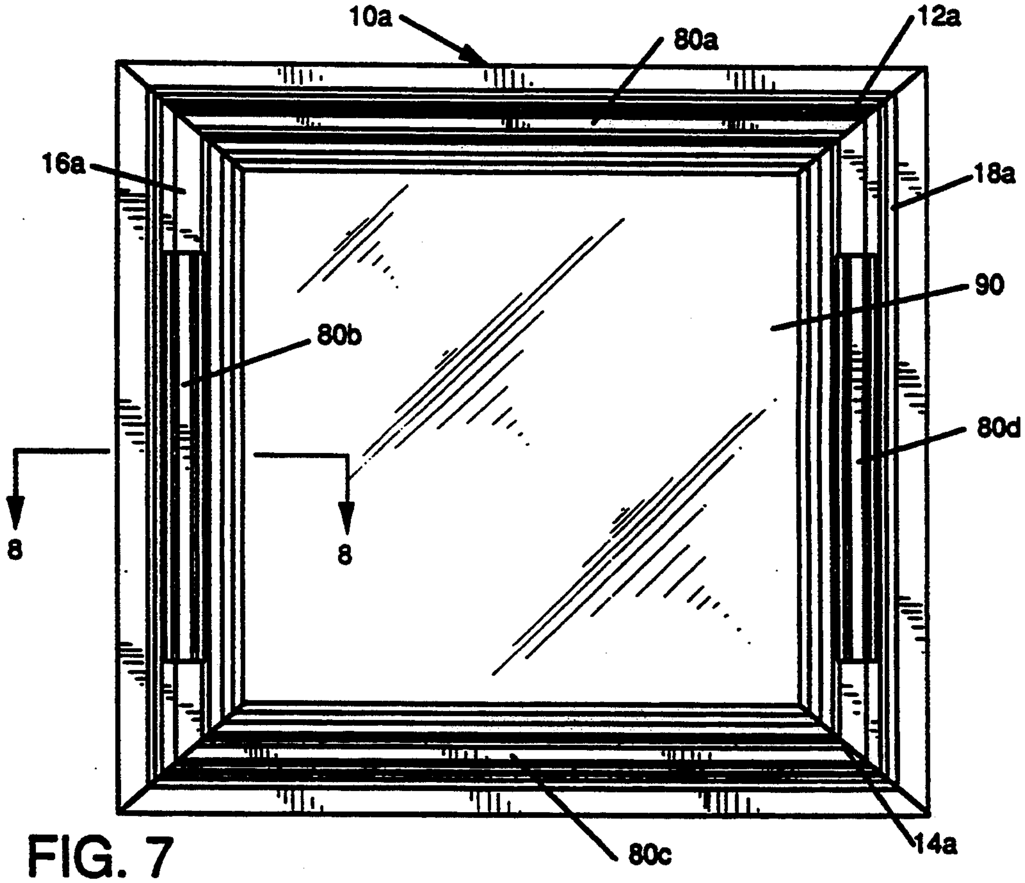
FIG. 7 is a front elevational view showing the connection means of FIG. 6 and a glazing panel placed in a first window sash framing portion.
Figure 8:
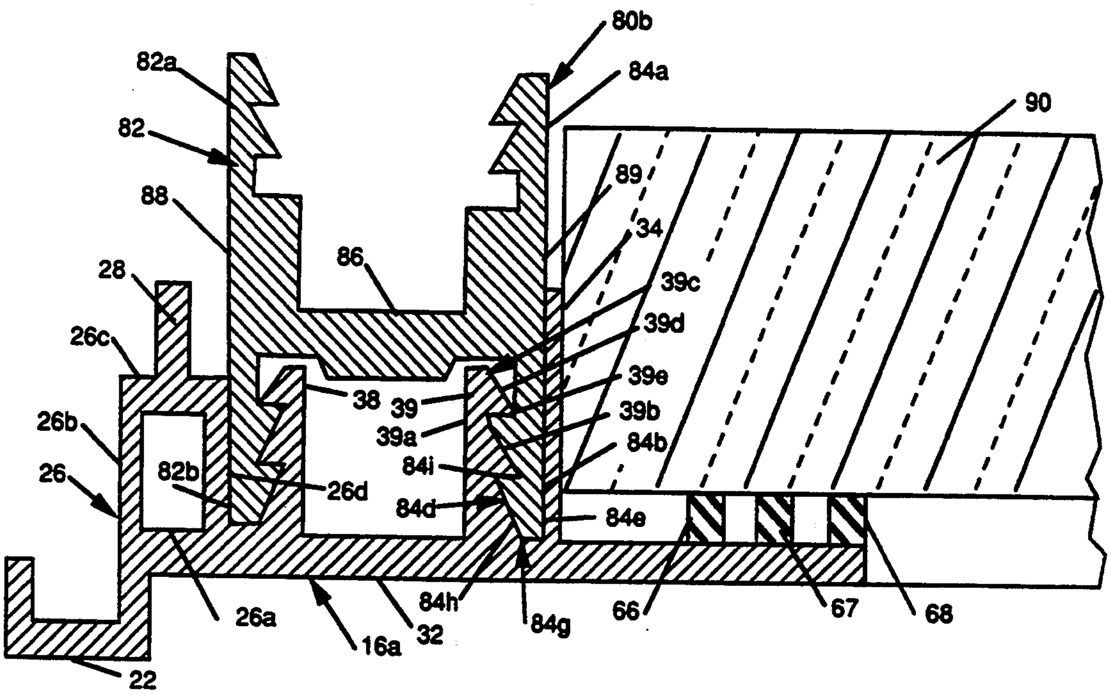
FIG. 8 is a cross-sectional view taken along line 8—8 of FIG. 7.

The connection means 80 is secured into locking mechanical interengagement with half member **16*a* as is shown in FIGS. 7 and 8. As can be seen from FIG. 7, a connection member is used in each half member. It is preferred that the horizontal connection members 80*a* and 80*c* have mitred corners and extend the entire length of the horizontal sash frame members 12*a* and 14*a*. The vertical connection members 80*b* and 80*d* are preferably cut to a length of at least 75% of the overall sash height, as shown in FIG. 7. These configurations for the connection members 80*a*, 80*b*, 80*c* and 80*d*** not only provide the necessary structural support but also reduce the amount of scrap in manufacturing.

Referring to FIG. 8, lower portions **82*b* and 84*b* of connection member 80*b* are secured into recesses 52 and 53 of half member 16*a*. This is accomplished by mechanical interengagement of the toothed portions of lower portions 82*b* and 84*b* with the recesses 52 and 53. It will be appreciated that the connection member 80*b* is secured to the half member 16*a* by effecting relative movement of the connection member 80*b* and the half member 16*a* so that, for example, bevelled edge 84*h* of tooth 84*g* rides on bevelled edge 39*d* of tooth 39*c* on flange 39 and over the bevelled edge of the bottom tooth of flange 39 until horizontal trailing edge 84*i* of tooth 84*g* snaps into surface-to-surface engagement with the horizontal trailing edge of the bottom tooth of flange 39. This provides positive mechanical interengagement between connection member 80***b* and half member 16*a*.

Once the connection and reinforcement members are secured to half member 10*a* as shown in FIG. 7, a glazing panel 90 is dropped into the window sash half member 10*a* as shown in FIGS. 7 and 8. The glazing panel 90 rests on weatherstripping strips 66–68 and against the lower portion of cut bridging flange 34 as is shown in FIG. 8.

Figure 9:
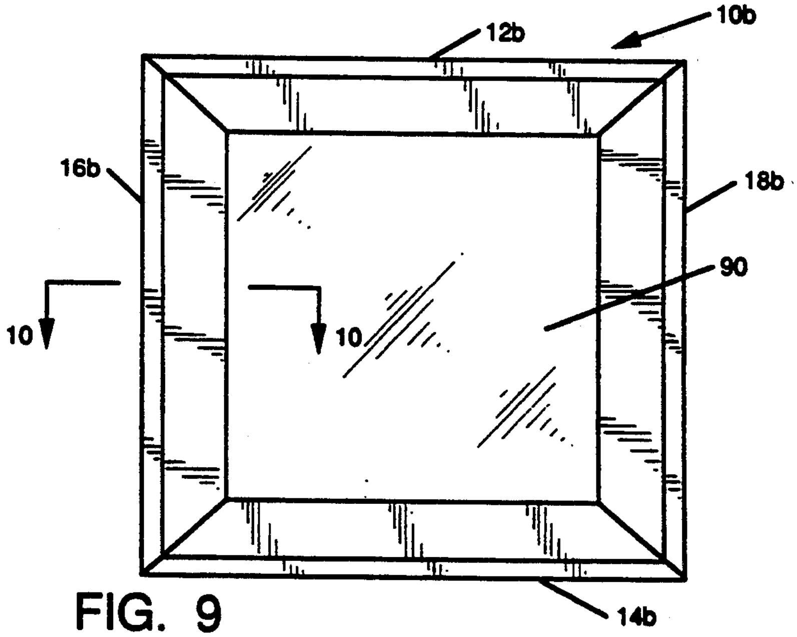
FIG. 9 is a front elevational view similar to FIG. 7 only showing the second window sash framing portion connected to the remainder of the window sash frame.
Figure 10:
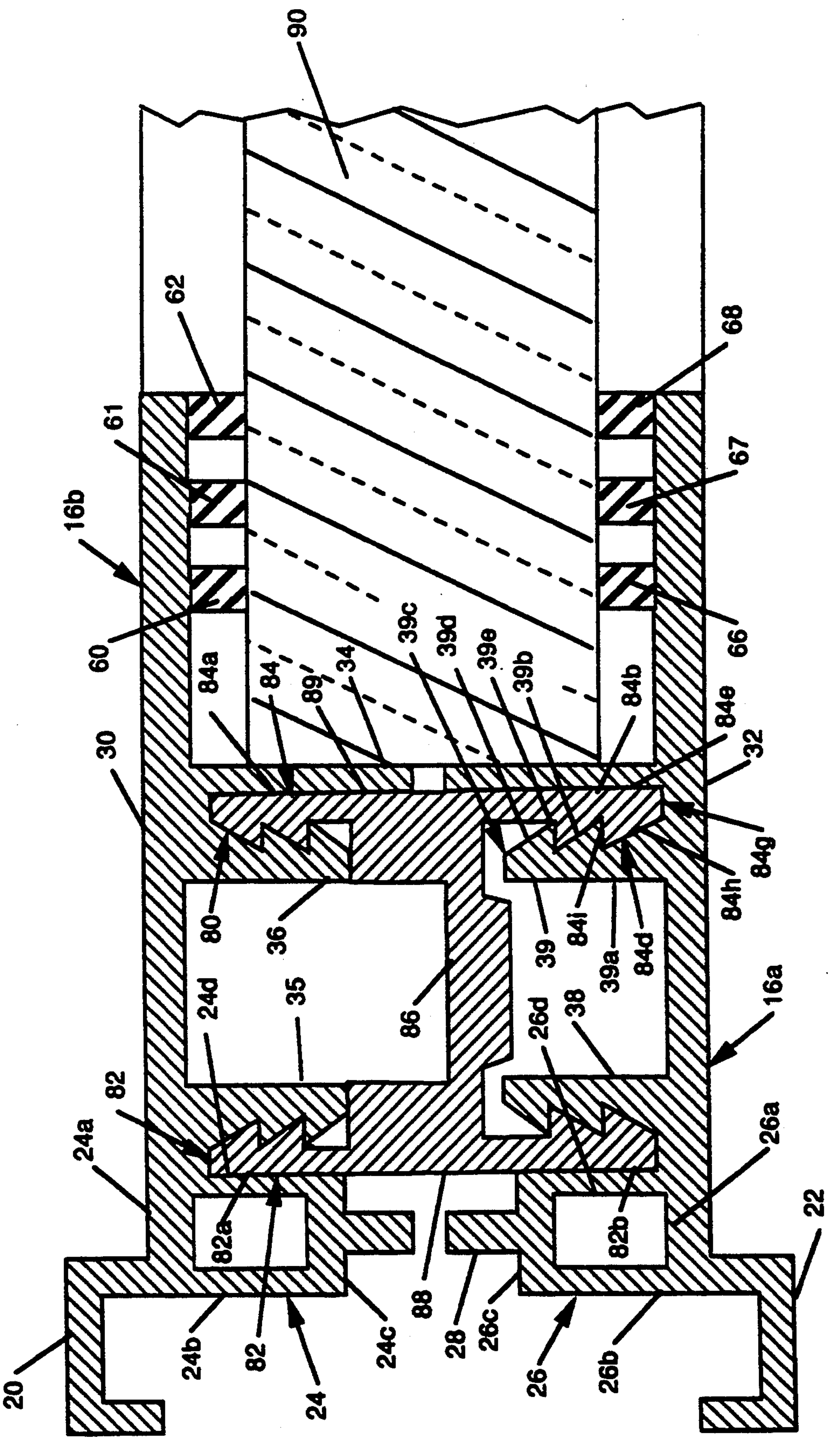
FIG. 10 is a cross-sectional view taken along line 10—10 of FIG. 9.

Referring now to FIGS. 9 and 10, half member 10*b* is then ready to be secured to the connection members in half member 10*a* to form the completed window sash. This is done by merely positioning the upper portions of connection members in the recesses of half member 10*b* and effecting relative movement of half member 10*b* and the connection members similar to that shown and described with respect to FIGS. 7 and 8. For example, as is shown in FIG. 10, upper portions 82*a* and 84*a* of connection and reinforcement members 80 are positioned in recesses 50 and 51 of half member 16*b* and are snapped into place similar to lower portions 82*b* and 84*b* into recesses 52 and 53. In this way, half member 10*b* will be secured to the connection and reinforcement members in half member 10*a* to form the window sash.

It will be appreciated that the method of producing a window sash and the resulting product provides a window sash that does not have a parting head. The window sash of the invention has smooth pleasing lines and is also less susceptible to tampering by intruders or the like and is more weathertight than prior art window sashes.

Whereas a particular embodiment of the invention has been described hereinabove, for purposes of illustration, it would be evident to those skilled in the art that numerous variations of the details may be made without departing from the invention as defined in the appended claims.

What is claimed is:

1. A method of producing a window sash comprising:
providing a window sash frame;
cutting said window sash frame longitudinally to create a first frame portion and a second frame portion, said first and second portion being completely severed from each other so that no section of one of said frame portions contacts any section of said other frame portion;
after cutting said window sash frame, securing rigid connection means in said first frame portion;
placing a glazing member into either of said first or second frame portions; and
securing said second frame portion to said first frame portion by means of said connection means to form said window sash.

2. The method of claim 1, including
securing said connection means to said framing portions by mechanical interengagement means.

3. The method of claim 2, including
providing said framing portions with at least one locking recess to receive said connection means;
providing said connection means with at least one flange adapted to be received into said recesses; and
establishing relative joining movement between said flange and said locking recess.

4. The method of claim 3, including
providing said flanges with teeth means;
providing said locking recesses with complementary barb means; and
engaging said teeth means with said barb means, whereby a tight mechanical interengagement is provided between said connection means and said framing portions.

5. The method of claim 4, including
forming two locking recesses in said framing portions;
forming said connection means in an H-shape having two substantially parallel flanges and a substantially perpendicular flange bridging therebetween; and
engaging said parallel flanges with said complementary locking recesses.

6. The method of claim 1, including
said window sash frame is made of a plurality of framing members.

7. The method of claim 6, including
said connection means consists of a plurality of connection members; and
securing at least one of said connection members in each said framing member.

8. The method of claim 1, including
employing said connection means to reinforce said window sash frame.

9. The method of claim 1, including
placing said glazing member into said first frame portion; and
securing said second frame portion to said connection means to form said window sash.

10. A method of producing a window sash comprising:
providing a window sash frame made of a plurality of extruded vinyl framing members;
cutting said window sash longitudinally to create a first frame portion and a second frame portion;
securing at least one aluminum connection member in each of said framing members;
placing a glazing member into either of said first or second frame portions; and
securing said second frame portion to said first frame portion by means of said connection members to form said window sash.

11. The method of claim 10, including
welding said framing members to each other to form said window sash frame.

* * * * *